US008738686B2

(12) United States Patent
Douthart

(10) Patent No.: US 8,738,686 B2
(45) Date of Patent: May 27, 2014

(54) DYNAMIC RESOURCE MANAGEMENT

(75) Inventor: Charles Douthart, Raleigh, NC (US)

(73) Assignee: Teradata US, Inc., Dayton, OH (US)

( * ) Notice: Subject to any disclaimer, the term of this patent is extended or adjusted under 35 U.S.C. 154(b) by 316 days.

(21) Appl. No.: 12/650,297

(22) Filed: Dec. 30, 2009

(65) Prior Publication Data

US 2011/0161401 A1    Jun. 30, 2011

(51) Int. Cl.
*G06F 15/16* (2006.01)

(52) U.S. Cl.
USPC .................... 709/203; 709/216; 709/219

(58) Field of Classification Search
USPC .................................. 709/201, 202, 203
See application file for complete search history.

(56) References Cited

U.S. PATENT DOCUMENTS

| | | | | |
|---|---|---|---|---|
| 6,157,943 | A * | 12/2000 | Meyer ............................ | 709/203 |
| 6,484,149 | B1 * | 11/2002 | Jammes et al. ............. | 705/26.62 |
| 7,209,929 | B2 | 4/2007 | Dominguez et al. | |
| 7,376,660 | B2 | 5/2008 | Backhouse | |
| 7,484,007 | B2 * | 1/2009 | Bannoura et al. ............. | 709/247 |
| 7,509,584 | B2 * | 3/2009 | Moser ........................... | 715/760 |
| 7,539,975 | B2 | 5/2009 | Atkin et al. | |
| 7,562,068 | B2 * | 7/2009 | Naam .................................. | 1/1 |
| 7,565,414 | B1 * | 7/2009 | Love ............................ | 709/219 |
| 7,617,482 | B2 | 11/2009 | Wang et al. | |
| 7,860,898 | B1 * | 12/2010 | Moranta et al. ............... | 707/803 |
| 2003/0023754 | A1 * | 1/2003 | Eichstadt et al. ............. | 709/246 |
| 2004/0172284 | A1 * | 9/2004 | Sullivan et al. ................... | 705/2 |
| 2004/0220997 | A1 * | 11/2004 | De Saint-Johns ............. | 709/201 |
| 2005/0108418 | A1 * | 5/2005 | Bedi et al. ..................... | 709/232 |
| 2006/0265417 | A1 * | 11/2006 | Amato et al. ................. | 707/102 |
| 2007/0042332 | A1 * | 2/2007 | Leem ............................ | 434/156 |
| 2008/0229217 | A1 * | 9/2008 | Kembel et al. ................ | 715/760 |
| 2010/0005410 | A1 * | 1/2010 | Pang ............................. | 715/765 |
| 2010/0064281 | A1 * | 3/2010 | Kimball et al. ............... | 717/124 |
| 2010/0153544 | A1 * | 6/2010 | Krassner et al. .............. | 709/224 |
| 2010/0153836 | A1 * | 6/2010 | Krassner et al. .............. | 715/234 |
| 2010/0180192 | A1 * | 7/2010 | Hall ............................. | 715/234 |

* cited by examiner

*Primary Examiner* — Dhairya A Patel
(74) *Attorney, Agent, or Firm* — Schwegman, Lundberg & Woessner, P.A.

(57) ABSTRACT

Techniques for dynamic resource management are presented. A World-Wide Web (WWW) page is acquired on first access to a WWW site and rendered with a script tag. When a browser loads the WWW page, the script tag is processed to remotely execute a script on the WWW site. The script produces a single file having code for the resources that are referenced in the WWW page. The single file is provided back to the browser where it is cached so that when any of the resources are accessed via the WWW page, the needed code for those resources are available for execution within the cache of the browser.

19 Claims, 3 Drawing Sheets

DYNAMIC RESOURCE MANAGEMENT

COPYRIGHT

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever. The following notice applies to the example source code as described herein and below: Copyright © 2009, Teradata, Inc. of Miamisburg, Ohio—All Rights Reserved.

BACKGROUND

Increasingly, enterprises are providing their services and data to consumers over the Internet and the World-Wide Web (WWW). To do this, enterprises are developing separate interfaces that link their backend systems to a WWW interface.

A variety of platform independent services are capable of being embedded within WWW pages that are accessible via WWW sites. These services include platform-independent code that is directly referenced via the WWW page.

Generally, web pages are downloaded from a WWW site on first access and as resources are accessed their code modules are acquired via Hypertext Transfer Protocol (HTTP) transactions and loaded to cache. The problem with these approaches is that a significant amount of network traffic can occur as each resource is requested for an initial and first time.

Furthermore, modern web applications typically generate messages for display to a user in both the web and application tiers. Some, platform-independent languages, such as JAVA, provide robust mechanisms for defining local-specific messages to display to the user. Yet, a standard mechanism is not available for running within a browser. Some recent JAVA script frameworks provide a mechanism for defining resource files for use in the web tier. However, the dynamic retrieval of files in these frameworks often results in multiple HTTP requests for each defined resource bundle; again, this creates excessive traffic for the web server.

SUMMARY

In various embodiments, techniques for dynamic resource management are presented. According to an embodiment, a method dynamic resource management is presented. Specifically, web site page is acquired for a web site; the web site page includes a plurality of resource references embedded within the web site page. Next, the web site page is rendered with a script tag, the script tag pointing to a script on a server that executes when the web site page is loaded to a browser of a client and the script when processed grabs all code for the resources associated with the embedded resources references as a single file when the web site page is loaded to the browser. Finally, the web site page having the script tag is delivered to the client over an Internet connection for use by the browser.

DETAILED DESCRIPTION

Figure 1:
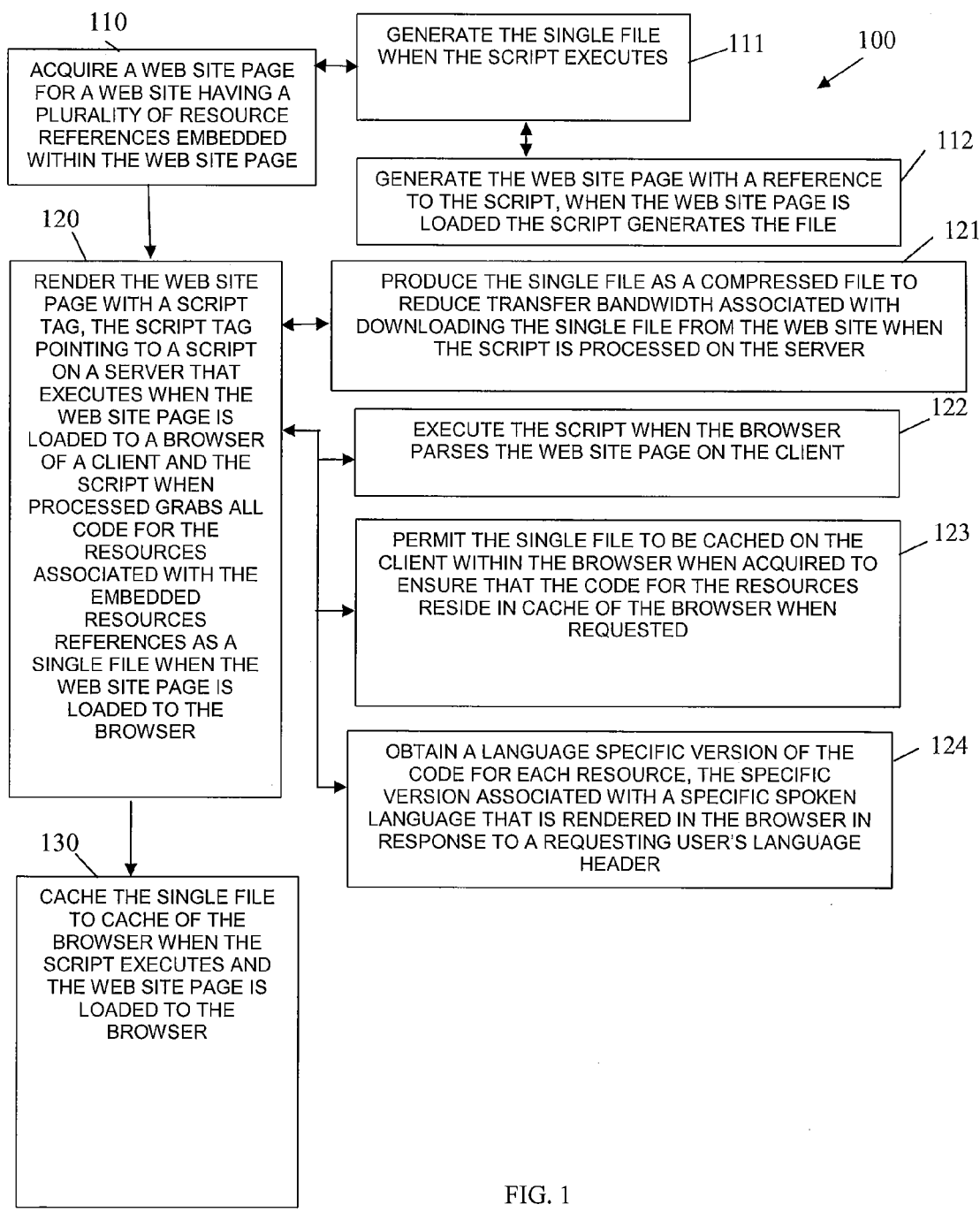
FIG. 1 is a diagram of a method for dynamic resource management, according to an example embodiment.

FIG. 1 is a diagram of a method 100 for dynamic resource management, according to an example embodiment. The method 100 (hereinafter "resource loading service") is implemented in a machine-accessible or computer-readable storage medium as instructions that is executed by a machine (processing device (processor-enabled with memory; can also be a multiprocessor device) performs the processing depicted in FIG. 1. The machine specifically configured to process the resource loading service. Moreover, the resource loading service e is operational and accessible over a network. The network may be wired, wireless, or a combination of wired and wireless. In an embodiment, the network is the Internet.

In an embodiment, the resource loading service is implemented as a WWW server site service that processes on a server-computing device, such as a device that delivers information, content, and services to users on client devices over the Internet.

A variety of services are provided over the Internet and the World-Wide Web (WWW). Supplying data, images, and other types of data is relatively straight forward with the use of Hypertext Transfer Protocol (HTML) language or eXtensible Markup Language (XML).

A more portable and platform independent approach is to provide the applications from the server of the WWW page itself in JAVA® Script, Microsoft .Net®, and others. These are essentially programming tools and execution environments that are portable and machine, browser, OS, and/or environment independent.

So, although various embodiments discussed herein use JAVA script as examples it is noted that the invention is not so limited.

The term "service" may be used interchangeably and synonymously with the term "application" herein. An application or service is software instructions residing in a computer-readable storage medium and that are executed by a processor that is configured to execute the instructions.

It is within this context that the processing associated with the FIG. 1 is now discussed.

At 110, the resource loading service acquires a web site page at a server delivering a web site, the web site page having a plurality of resource references embedded within the web site page. The resources are modules written in platform-independent code that execute within client browsers via a plugin or real-time execution environment. The web site page is initially acquired or requested from within a client browser that is accessed via a Uniform Resource Locator (URL) link or via an address bar of the browser where the Internet Protocol (IP) address or URL is manually provided in the address bar by the user.

According to an embodiment, at 111, the resource loading service generates the single file (discussed below with reference to the processing at 120) when a browser executes the script (discussed below). The single file has the code for each of the resources to execute within the browser and via the web site page.

Continuing with the embodiment of 111 and at 112, the resource loading service generates the single file with a reference to the script and the script when executed upon loading of the page produces the single file.

At 120, the resource loading service renders the web site page with a script tag (reference to the script discussed with embodiment of 112). The script tag points to a script (discussed above with the embodiments of 111 and 112). The script residing on a server, such as the server that processes the resource loading service and includes content for the web site page. When the web site page is loaded to a browser of a client (associated with a requesting user), the script processes (in response to the script tag) and grabs all the code for the resources (embedded as the references to the resources within the web site page) and produces a single file having all the code.

In an embodiment, at 121, the resource loading service produces the single file as a compressed file to reduce transfer bandwidth associated with downloading the single file from the web site when the script is processed on the server.

In another case, at 122, the resource loading service executes the script when the parses the web site page on the client for loading within the browser of the client.

In yet another situation, at 123, the resource loading service permits the single file to be cached on the client within the browser when acquired to ensure that the code for the resources reside in cache of the browser when requested by a user interacting with the web site page within the browser and on the client.

In one situation, at 124, the resource loading service obtains a language specific version of the code for each resource, the specific version associated with a specific spoke language that is rendered in the browser in response to a requesting user's language header.

At 130, the resource loading service caches the single file to cache of the browser when the script executes and the web site page is loaded to the browser of the client.

In this manner, when a user loads a web site page, the script tag causes the script on the server to process. The script produces a single file delivered to cache of the browser on the client so that code for each needed resource identified as embedded references within the loaded web site page can be acquired via the cache using the single file. This reduces network traffic and improves response time on the client and thereby improves the user's experience with the web site and the web site page.

Figure 2:
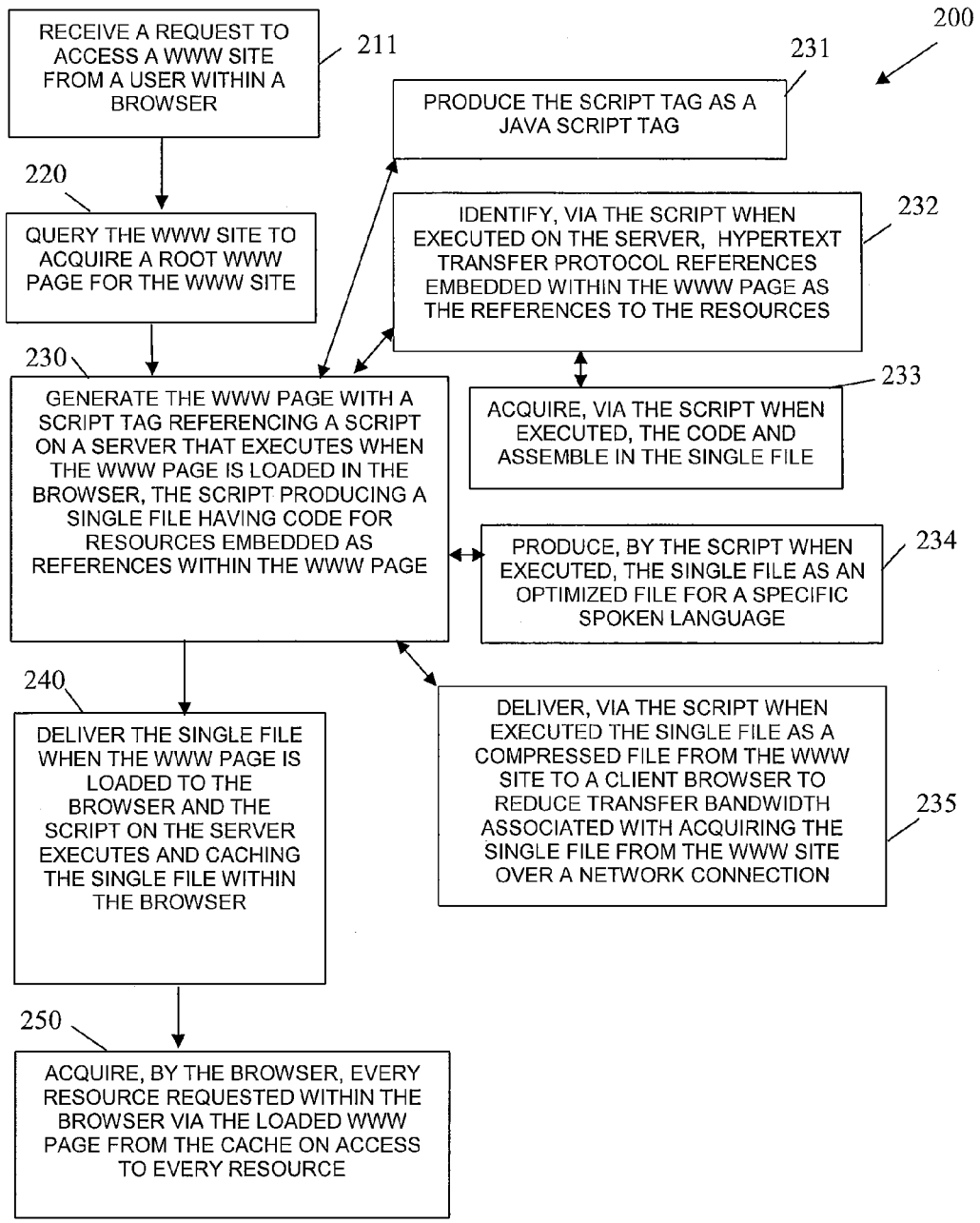
FIG. 2 is a diagram of another method for dynamic resource management, according to an example embodiment.

FIG. 2 is a diagram of another method 200 for dynamic resource management, according to an example embodiment. The method 200 (hereinafter "server service") is implemented in a machine-accessible or a computer-readable storage medium as instructions that are executed by a machine (one or more processors) and perform the processing reflected in FIG. 2. Again, the machine is specifically configured to process the server service. The server service is also accessible and operational over a network. The network may be wired, wireless, or a combination of wired and wireless. In an embodiment, the network is the Internet.

The server service presents another and in some cases an enhanced processing perspective to the resource loading service represented by the method 100 of the FIG. 1.

At 210, the server service receives a request to access a WWW site from a user within a browser. That is the request is received over the Internet via a browser of a user.

At 220, the server service queries the WWW site to acquire a root WWW page for the WWW site.

At 230, the server service generates the WWW page with a script tag. The script tag identifies and references a script on the sever (remote over the network from the browser of the client). The script is executed on the server when the WWW page is loaded in the browser and when executed the script produces a single file having code for resources embedded as references within the WWW page.

According to an embodiment, at 231, the server service produces the script tag as a JAVA script tag.

In another case, at 232, the server service identifies (when the script is executed on the server), HTTP references embedded within the WWW page as references to the resources. This is used to assemble the code for the resources into one centralized location, namely the single file.

So, continuing with the embodiment of 232 and at 233, the server service acquires (when the script is executed on the sever) the code and assembles the single file.

In one case, at 234, the server service produces (again when the script is executed on the server) the single file as an optimized file for a specific spoken language as requested by a user and as identified in a language header of the request.

In another complimentary situation, at 235, the server service (when the script is executed on the server) delivers the single file as a compressed file from the WWW site to a client browser to reduce transfer bandwidth associated with acquiring the single file from the WWW over a network connection, such as an Internet connection.

At 240, the server service delivers the single file when the WWW page is loaded to the browser and the script on the server executes. The single file is then cached within the browser so that the code for the resources is available from cache of the browser and any particular resource is locally acquired within the processing environment of the browser and does not have to generate any network traffic.

During operation at the client, at 250, the browser acquires every resource requested within the browser via the WWW loaded page from the cache when access is requested via a user activating a link within the page to any particular resource.

Figure 3:
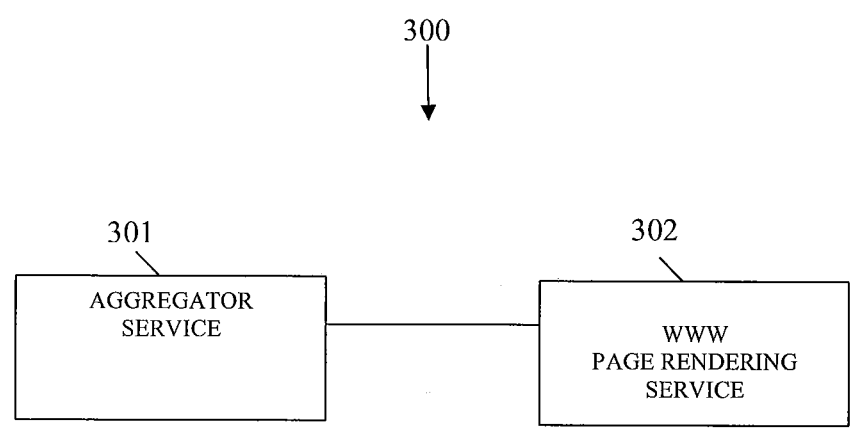
FIG. 3 is a diagram of a dynamic resource management system, according to an example embodiment.

FIG. 3 is a diagram of a dynamic resource management system 300, according to an example embodiment. The dynamic resource management system 300 is implemented in a machine-accessible and/or computer-readable storage medium that is executed by one or more processors and is operational over a network. The network may be wired, wireless, or a combination of wired and wireless. In an embodiment, the network is the Internet.

In an embodiment, portions of the dynamic resource management system 300 implements, among other things the resource loading service and the server service represented by the methods 100 and 200 of the FIGS. 1 and 2, respectively.

The dynamic resource management system 300 includes an aggregator service 301 and a WWW page rendering service 302. Each of these and their interactions with one another will now be discussed in turn.

The aggregator service 301 is implemented in a computer-readable storage medium and executes on a processor of the network. Example aspects of the aggregator service 301 were described above with reference to the methods 100 and 200 of the FIGS. 1 and 2, respectively.

The aggregator service 301 is configured to aggregate code for multiple web-based resources (applications) into a single file for delivery to a WWW site over a network connection, such as an Internet connection.

According to an embodiment, the aggregator service 301 is further configured to optimize different versions of the single file for spoken language specific requests. That is, a requestor that accesses the web-site will have a language header set in the request, such as English, French, Spanish, German, Chinese, Arabic, etc. So, the aggregator service 301 is configured to optimize the single file with code for each of the resources in a specific language.

In another case, the aggregator service 301 is configured to optimize the single file as s compressed file to reduce transfer bandwidth when the single file is transferred over the network. This reduces the size of the single file and improves network throughput and utilization.

The WWW page rendering service 302 is implemented in a computer-readable storage medium and is to execute on a processor (server) of the network. Example aspects of the WWW page rendering service 302 were provided in detail above with reference to the methods 100 and 200 of the FIGS. 1 and 2, respectively.

The WWW page rendering service 302 is configured to generate (render) a WWW page with a script tag. The script tag identifies a script that executes on a server and uses the aggregator service 301 to deliver the single file to cache of the browser when the WWW page is loaded to the browser. This ensures that when a request within the browser is made to access a particular resource, the particular code for that resource is available in the cache of the client via the single file.

According to an embodiment, the WWW page rendering service 302 is configured to add the script tag for the script when a user requests the WWW page over the Internet.

In another case, the WWW page rendering service 302 is configured to pass the generated WWW page and the script tag to the browser so that when the browser attempts to load the WWW page, the script tag is used to process the script remote from the client (on the server) thereby producing the single file that is then downloaded to the cache of the client.

Some example illustrations and code to implement various features of the techniques presented herein are now provided for further comprehension of the teachings presented herein. These examples are provided with reference to JAVA® although it is to be understood that other platform-independent coding languages and tools may be used as well without departing from the teachings provided herein.

Resource Definition

Define all string javascript resources as simple javascript files similar to the following file for common resources.

```
{
    infobar__nextMessage : "Go to next message",
    infobar__prevMessage : "Go to previous message",
    infobar__showAllMessages : "Show all messages"
}
              Copyright Teradata, Inc. 2009
```

These files are given unique names that correspond to the variable names by which they are later accessed.

Translations of the pertinent resources reside in a directory structure on the web server. In the case of Teradata Relationship Manager® (TRM) (distributed by Teradata, Inc. of Miamisburg, Ohio), this directory is "trm/js/nls." A single file containing all of the resources for a specific translation is written, and a HTML script element referencing this file is written to allow the browser and web server to cache the resources as a normal file.

Resource Resolution

At the time an HTTP Request is received for a specific page, the accept-language header is interrogated for an appropriate language identifier. The appropriate resource translation is located, and a single, optimized file is created if it does not already exist. If no specific translation can be located, then the default language is used (US English for TRM). This file defines a simple JavaScript object structure for accessing the translated resources. The generated resource is included in the requested page via a standard script tag to take advantage of browser and web server caching.

The Dojo framework implements a complex, build based resource management system, but it is inefficient (see above) and tied to a build-time resource resolution structure that renders it unusable in situations where translations must be modified after a release build.

Resources are modified at any time, even in a running deployment. A single request is issued to the HTTP server for localized resources for the entire application. Code for the included resources may be optimized and compressed to reduce transfer bandwidth even further.

Sample Implementation Code

```
package com.teradata.trm.common.web.taglib;
import java.io.File;
import java.io.FileWriter;
import java.io.IOException;
import java.io.PrintWriter;
import java.util.Iterator;
import javax.servlet.ServletContext;
import javax.servlet.jsp.JspException;
import javax.servlet.jsp.PageContext;
import javax.servlet.jsp.tagext.SimpleTagSupport;
import org.apache.commons.io.FileUtils;
import org.apache.commons.io.FilenameUtils;
/**
 * The Class jsnlsTag.
 */
public class jsnlsTag extends SimpleTagSupport {
    /** The nls root. */
    private String nlsRoot = "common/script/trm/nls"; // TODO; config option
    /** The nls dest. */
    private String nlsDest = nlsRoot;
    /**
     * Locate the source directory for resources
     *
     * @param baseDir the base dir
     * @param In the In
     * @param requireExists the require exists
     *
     * @return the file
     */
```

-continued

```
    private File locateNLSDirectory(File baseDir, String ln, Boolean
requireExists) {
        File Id = new File(baseDir,ln);
        int di = 0;
        while (!Id.exists( ) && (di = ln.indexOf('-')) > 0) {
            ln = ln.substring(0, di);
        }
        return Id.exists( ) ? Id : (requireExists ? baseDir : Id);
    }
    /* (non-Javadoc)
     * @see javax.servlet.jsp.tagext.SimpleTagSupport#doTag( )
     */
    @Override
    public void doTag( ) throws JspException, IOException {
    PageContext pc = (PageContext)getJspContext( );
        ServletContext sc = pc.getServletContext( );
        String ln =
pc.getRequest( ).getLocale( ).toString( ).toLowerCase( );
        File nlsRootDir = new File(sc.getRealPath(nlsRoot));
        File src = locateNLSDirectory(nlsRootDir, ln, true);
        File destRootDir = new File(sc.getRealPath(nlsDest));
        File dest = new File(destRootDir,ln);
        if (!dest.exists( )) {
            dest.mkdir( );
        }
        Iterator i = FileUtils.iterateFiles(src, new String[ ] {"js"}, false);
        File outFile = new File(dest,"trm-nls.js");
        if (!outFile.exists( )) {
            PrintWriter out = new PrintWriter(new
FileWriter(outFile));
            out.println("(function ( ) {");
            out.println("trm = top.trm || { };");
            while (i.hasNext( )) {
                File f = (File)i.next( );
                String fn =
FilenameUtils.getBaseName(f.getName( ));
                out.println("");
                out.println("/* BEGIN " + f.getName( ) + "*/");
                out.print("trm.nls." + fn + "=");
                String r = FileUtils.readFileToString(f, "UTF-8");
                out.write(r.substring(r.indexOf('{')));
                out.println("");
                out.println("/* END " + f.getName( ) + "*/");
            }
            out.println("}) ( );");
            out.close( );
        }
        getJspContext( ).getOut( ).println("<scripttype=\"text/javascript\"
src=\""+ nlsDest + "/" + dest.getName( ) + "/" + outFile.getName( ) + "\">
</script>");
    }
}
Simple JSP using the tag
<%@ page language="java" contentType="text/html; charset=UTF-8"
pageEncoding="UTF-8"%>
<%@ taglib tagdir= "/WEB-INF/tags/common"        prefix="trmCommon"%>
<trm:jsnls />
                    Copyright Teradata, Inc. 2009
```

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

The Abstract is provided to comply with 37 C.F.R. §1.72(b) and will allow the reader to quickly ascertain the nature and gist of the technical disclosure. It is submitted with the understanding that it will not be used to interpret or limit the scope or meaning of the claims.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate exemplary embodiment.

The invention claimed is:

1. A method implemented as executable instructions in a non-transitory computer-readable storage medium and executed on a processing device, the executable instructions when executed by the processing device cause the processing device to perform the method, comprising:

acquiring, via a processing device, a web site page for a web site having a plurality of resource references embedded within the web site page;

rendering, via the processing device, the web site page with a script tag, the script tag pointing to a script on a server that executes on the server when the web site page is loaded to a browser of a client and the script when processed on the server grabs all code for the resources associated with the embedded resources references as a single file when the web site page is loaded to the browser and the single file provided to a cache of the processing device for the browser to access and when any of the resources are requested that requested resource is serviced from the cache without generating any network traffic, and each and every resource acquired within a processing environment of the browser; and delivering, via the processing device, the web site page having the script tag to the client over an Internet connection for use by the browser, the browser causing the script to execute, via the script tag, delivering the single file to the cache of the browser, the single file having all the code for the resources including original references that were included for particular ones of the resources, all resources exist, via the code, in the cache within the single file.

2. The method of claim 1, wherein acquiring further includes generating the single file having the code for each of the resources when the script executes.

3. The method of claim 2, wherein acquiring further includes generating the web site page at the web site with a reference to the script when the web site page is loaded to the browser the script executes and generates the single file.

4. The method of claim 1, wherein rendering further includes producing the single file as a compressed file to reduce transfer bandwidth associated with downloading the single file from the web site when the script is processed on the server.

5. The method of claim 1, wherein rendering further includes executing the script when the browser parses the web site page on the client.

6. The method of claim 1, wherein rendering further includes obtaining a language specific version of the code for each resource, the language specific version associated with a specific spoken language that is rendered in the browser in response to a requesting user's language header.

7. The method of claim 1, wherein delivering further includes caching the single file to the cache of the browser when the script executes and the web site page is loaded to the browser.

8. A method implemented as executable instructions in a non-transitory computer-readable storage medium and executed by a processor, the executable instructions when executed by the processor cause the processor to perform the method, comprising:

receiving, via the processor, a request to access a World-Wide Web (WWW) site from a user accessing the Internet to make the request via a browser;

querying, via the processor, the WWW site to acquire a root WWW page for the WWW site;

generating, via the processor, the WWW page with a script tag referencing a script on a server that executes on the server when the WWW page is loaded in the browser, the script producing a single file having all code for all resources embedded as references within the WWW page and the single file cached on the processor of the browser when the script is executed for access by the browser from cache, and when any particular resource is requested that requested resource is serviced from the cache without generating any network traffic, and each and every resource acquired within a processing environment of the browser; and delivering, via the processor, the single file when the WWW page is loaded to the browser and the script on the server executes and the script caches the single file within the browser, all the code for all the resources is locally acquired within the processing environment of the browser without generating any network traffic.

9. The method of claim 8, wherein generating further includes producing the script tag as JAVA script tag.

10. The method of claim 8, wherein generating further includes identifying, via the script when executed on the server, Hypertext Transfer Protocol (HTTP) references embedded within the WWW page as the references to the resources.

11. The method of claim 10, wherein identifying further includes acquiring, via the script when executed, the code and assemble in the single file.

12. The method of claim 8, wherein generating further includes producing, by the script when executed, the single file as an optimized file for a specific spoken language.

13. The method of claim 8, wherein generating further includes delivering, by the script when executed, the single file as a compressed file from the WWW site to the browser to reduce transfer bandwidth associated with acquiring the single file from the WWW site over a network connection.

14. The method of claim 8 further comprising, acquiring, by the browser, every resource requested within the browser via the loaded WWW page from the cache on access to every resource.

15. A processor-implemented system comprising:
a processor;
an aggregator service implemented in a non-transitory computer-readable storage medium and to execute on the processor; and
a World-Wide Web (WWW) page rendering service implemented in a non-transitory computer-readable storage medium to execute on the processor;
the aggregator service is configured to aggregate all code for multiple web-based resources into a single file for delivery from a WWW site over a network connection, the WWW page rendering service is configured to generate a WWW page with a script tag, the script tag identifying a script that executes on a server and that uses the aggregator service to deliver the single file to cache of a browser for a client when the WWW page is loaded to the browser to ensure that when a request in the browser is made to access any requested resource, the particular code for that requested resource is serviced from cache via the single file within a local processing environment of the browser without generating any network traffic, and each and every resource is acquired within the local processing environment of the browser, the script when executed on the server caches the single file to the cache of the browser within the client.

16. The system of claim 15, wherein the aggregator service is configured to optimize different versions of the single file for spoken language specific requests.

17. The system of claim 15, wherein the aggregator service is configured to optimize the single file as a compressed file to reduce transfer bandwidth when the single file is transferred over the network.

18. The system of claim 15, wherein WWW page rendering service is configured to add the script tag for the script when a user requests the WWW page over the Internet.

19. The system of claim 15, wherein the WWW page rendering service is to pass the generated WWW page and the script tag to the browser and when the browser attempts to load the WWW page, the script tag is referenced to remotely process the script thereby producing the single file.

* * * * *